Figure 13:
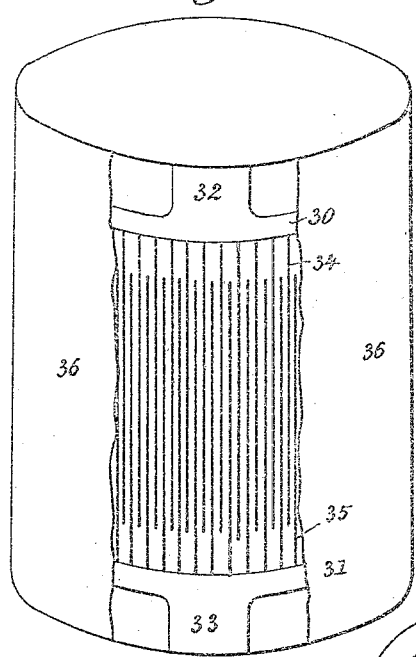

P. RIBBE.
MANUFACTURE OF SENSITIVE CELLS.
APPLICATION FILED JAN. 28, 1909.
919,078.
Patented Apr. 20, 1909.
3 SHEETS—SHEET 1.
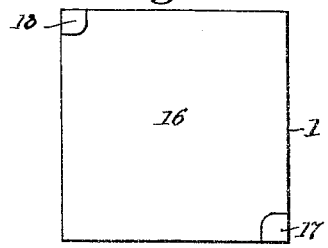
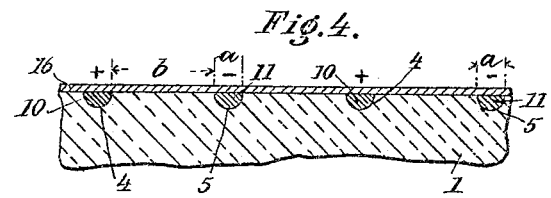
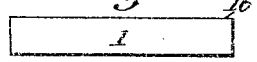
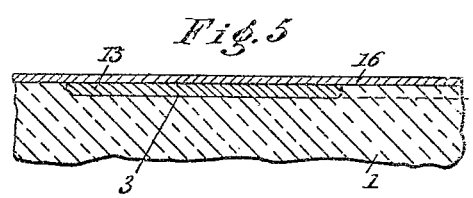
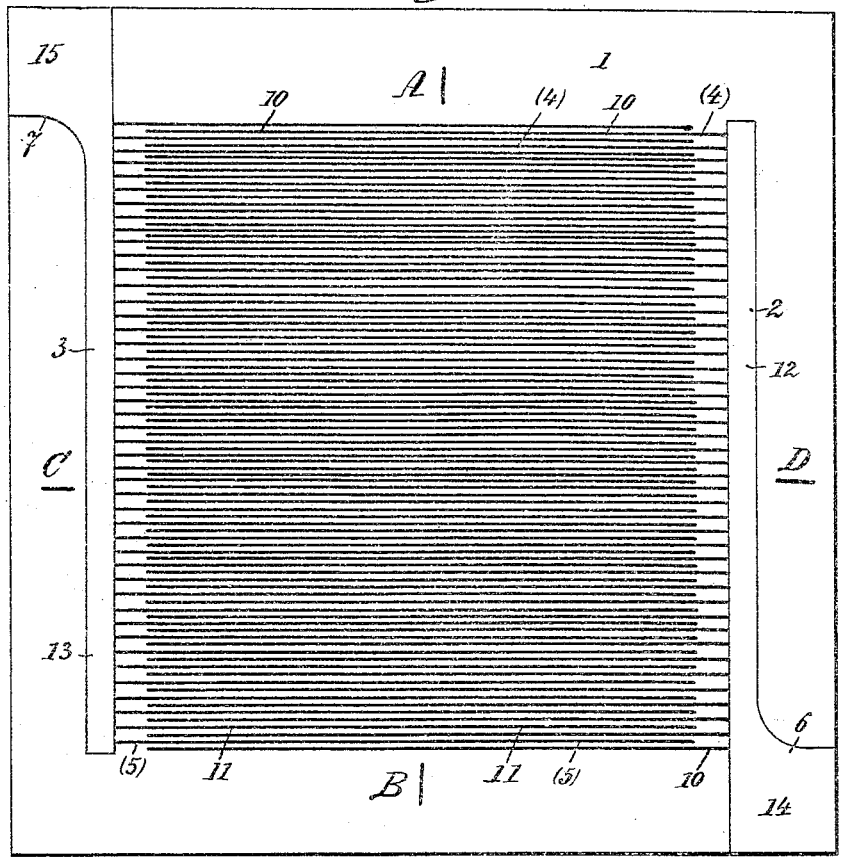
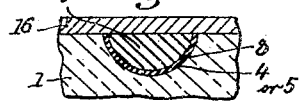
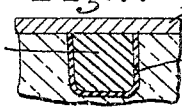
Witnesses
N. M. Avery
J. P. Davis
Inventor
Paul Ribbe
By Munn & Co.
Attorneys.

P. RIBBE.
MANUFACTURE OF SENSITIVE CELLS.
APPLICATION FILED JAN. 28, 1909.
919,078.
Patented Apr. 20, 1909.
3 SHEETS—SHEET 2.
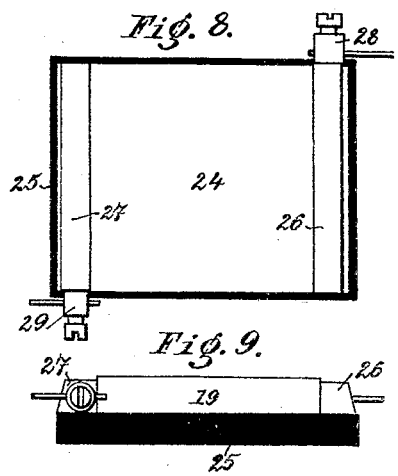
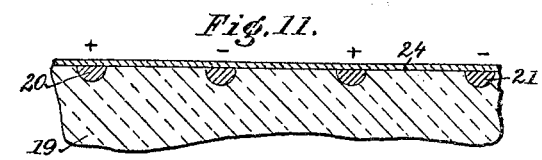
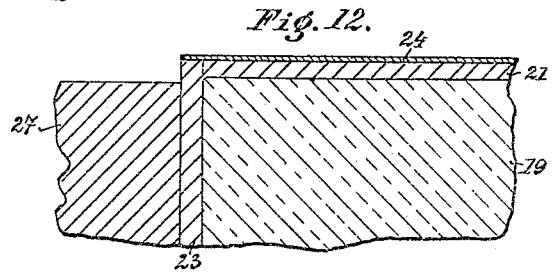
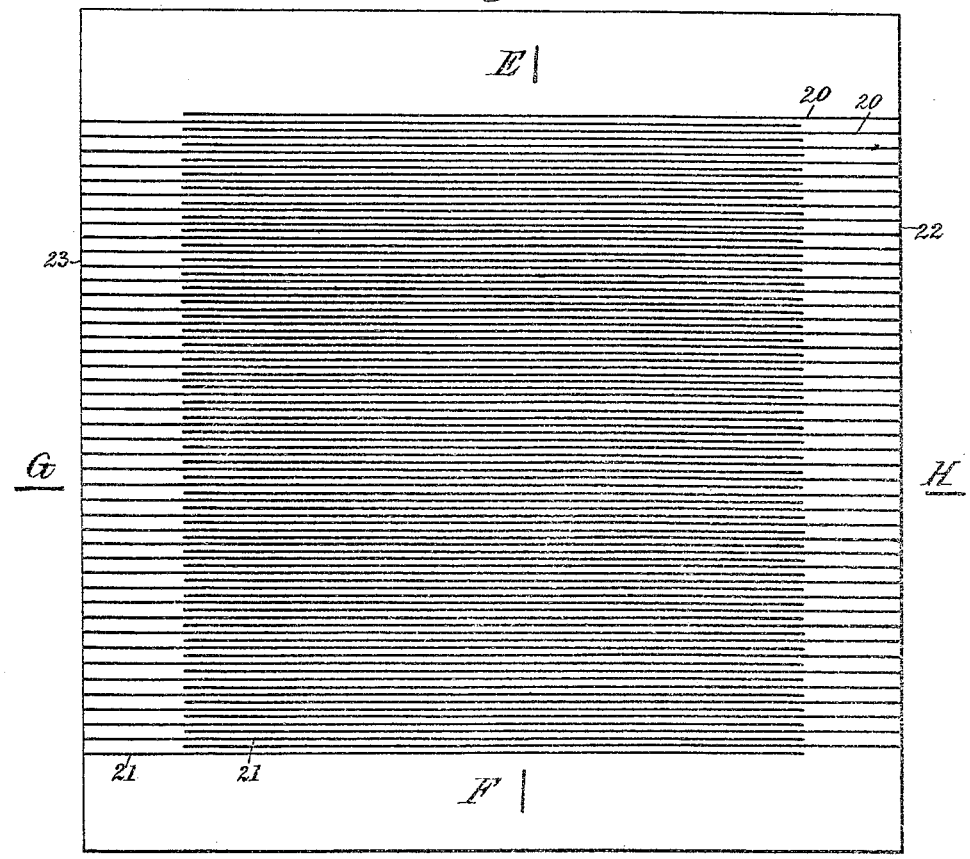
Witnesses
W. M. Avery
J. P. Davis
Inventor
Paul Ribbe
By Munn & Co
Attorneys

P. RIBBE.
MANUFACTURE OF SENSITIVE CELLS.
APPLICATION FILED JAN. 28, 1909.

919,078.

Patented Apr. 20, 1909.
3 SHEETS—SHEET 3.

Witnesses
W. M. Avery
J. P. Davis

Inventor
Paul Ribbe
By Munn & Co.
Attorneys

UNITED STATES PATENT OFFICE.

PAUL RIBBE, OF HALENSEE, NEAR BERLIN, GERMANY, ASSIGNOR TO FERN-SCHNELL-SCHREIBER GESELLSCHAFT MIT BESCHRÄNKTER HAFTUNG, OF BERLIN, GERMANY.

MANUFACTURE OF SENSITIVE CELLS.

No. 919,078.      Specification of Letters Patent.      Patented April 20, 1909.

Application filed January 28, 1909. Serial No. 474,810.

*To all whom it may concern:*

Be it known that I, PAUL RIBBE, a subject of the German Emperor, residing at Halensee, near Berlin, in the Empire of Germany, have invented a new and useful Manufacture of Sensitive Cells, of which the following is a specification.

The efficiency and sensitiveness of selenium cells having parallel conductors covered with selenium chiefly depend upon the narrowness of the several metallic strips in proportion to the width of the dividing strips of selenium which latter width is limited by the small electric conductibility of the selenium. The finer the metallic strips are made, the more sensitive will be the cell. This condition is not complied with by the ordinary selenium cells consisting of parallel metallic wires at a small distance from one another and of a filling of selenium.

A special method has been made known for producing selenium cells as follows: A glass plate is covered with a fine layer of metal, such as platinum or copper, after which fine parallel lines are cut into this metallic layer with a draw-point (which is easy as the metal does not firmly adhere to the glass), so that thereby fine lines of the glass are uncovered. At last the glass plate is covered with a thin layer of selenium, so that the fine lines uncovered on the glass plate are filled with selenium and the metallic strips are normally thereby electrically insulated. However, these fine selenium lines as they appear through the glass plate stand in a proportion to the metallic strips which is the reverse of the right one. It is not possible to obtain the correct proportion between the width of the fine metallic conductors and that of the selenium strips, as it is impossible to remove with a draw-point or other tool so wide parallel strips of the metallic cover from the glass plate as to leave on the latter fine metallic lines like hair-lines, since the metal does not sufficiently adhere to the glass.

My invention relates to a new method, whereby fine parallel metallic conductors in the shape of hair-lines are produced, so that after covering them with a fine layer of selenium or the like a cell sensitive to light is obtained, which is superior to the ordinary selenium cells as regards the efficiency and sensitiveness. When assuming the width of the selenium strips permitted by the small electric conductibility of the selenium to be say two tenths of one millimeter, then the width of the metallic conductors should be but a fraction of one hundredth of a millimeter in order to obtain the maximum sensitiveness of the cell. My new method renders it possible to produce sensitive cells coming nearer to this point than the old selenium cells.

I will now proceed to describe my invention with reference to the accompanying drawings, in which—

Figure 14:
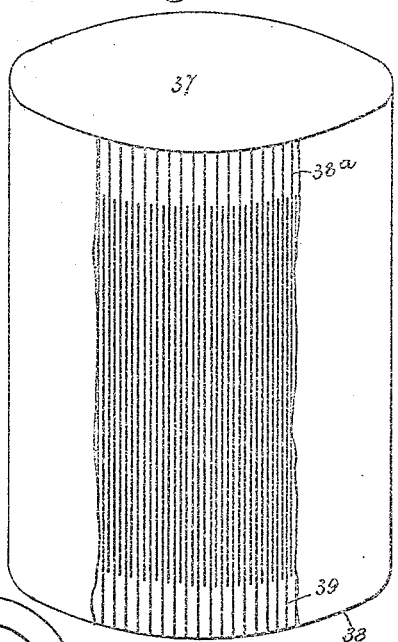
Figure 16:
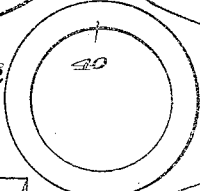
Figure 15:
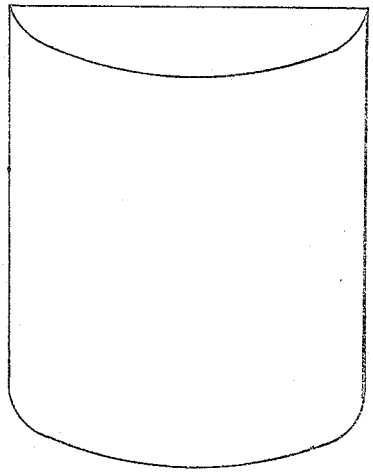
Figure 16:
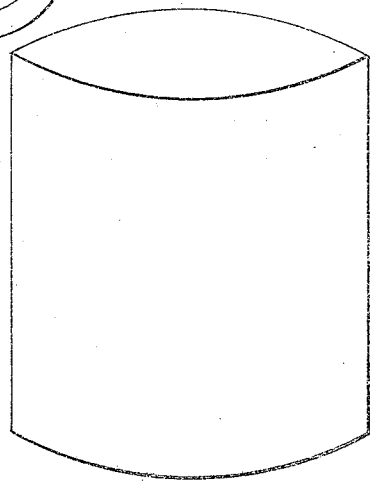
Figure 17:

Figure 1 is a plan view of a sensitive plate produced according to my method, this plate being assumed to be square and to present its face covered with selenium or the like, only two opposite corners being left uncovered, Fig. 2 is an elevation of the same, Fig. 3 is a plan view on a magnified scale of the face of this plate, the covering layer being removed, Fig. 4 is a vertical section on a more magnified scale through a part of the sensitive plate with a few metallic conductors on the line A—B in Fig. 3, Fig. 5 is a vertical section on the same magnified scale through another part of the sensitive plate on the line C—D in Fig. 3, this part being on the left, Fig. 6 is a vertical cross section on a still more magnified scale through one metallic conductor, Fig. 7 is a similar section through a modified metallic conductor, Fig. 8 is a plan view of a modified sensitive plate in combination with a supporting board and two opposite metallic strips between which the sensitive plate is secured, the latter presenting its face covered with selenium or the like, Fig. 9 is an elevation of the same, Fig. 10 is a plan view on a magnified scale of the face of this plate, the covering layer being removed, Fig. 11 is a vertical section on a more magnified scale through a part of the same with a few metallic conductors on the line E—F in Fig. 10, Fig. 12 is a vertical section on the same magnified scale through the left edge of the plate on the line G—H in Fig. 10, Fig. 13 is a perspective view of a sensitive cylinder on a magnified scale, part of the covering layer being removed to show the metallic conductors, Fig. 14 is a similar perspective view of a modified sensitive cylinder, Fig. 15 is a perspective view of a sensitive semi-cylinder on any scale, Fig. 16 is a perspective view of a sensitive cylinder-lens on any scale, Fig. 17 is an end view of a sensitive prism on any scale, the base of which is a segment, and Fig. 18 is a detail view on a reduced scale of a modified form of collecting conductor.

Similar characters of reference refer to similar parts throughout the several views.

The sensitive cell to be produced by my method may be a plate, a cylinder, a semi-cylinder, a cylinder-lens, a prism or any other mathematical body.

Figs. 1 to 7 illustrate a sensitive plate which is shown as square but may have any other shape. It is produced as follows: A glass plate 1 is on its trued up face provided with two collecting channels 2 and 3 along two opposite sides and with a series of very fine parallel grooves 4, 5 (Figs. 4 and 5), which alternately communicate with one collecting channel 2 or 3 and end at a distance from the other collecting channel 3 or 2, as is clearly shown at Fig. 3. The width $a$ (see Fig. 4) of each groove 4 or 5 should be made smaller than that $b$ of the strips left of the face of the plate 1 between any two grooves 4 and 5. In Fig. 5 $a$ and $b$ are shown to stand in a proportion of about 1:4, but this proportion may be varied in accordance with the tension of the current intended to be passed through the cell and with the desired efficiency and sensitiveness of the cell. The width $a$ of the parallel grooves 4 and 5 is made as small as possible and may be reduced down to perhaps a fraction of one hundredth of a millimeter. The width $b$ of the strips left on the face of the plate 1 between any two grooves 4 and 5 is equally made as small as possible and may be reduced perhaps down to about two tenths of one millimeter. As it is impossible to show these extremely fine and tight grooves in Fig. 1, I have omitted them from this figure and shown them on a magnified scale in Fig. 3. The collecting channels 2 and 3, on the contrary, are made broader, approximately as is in proportion shown at Fig. 3. Preferably they are each widened at one end at 6 or 7 in Fig. 3. The said collecting channels 2, 3 and parallel grooves 4, 5 are produced in any known manner, for example by etching with fluorhydric acid, the face of the glass plate 1 having been covered with a layer of wax, into which layer corresponding lines or grooves have been cut by a tool. Or the parallel grooves 4, 5 may be produced direct by cutting with a diamond. Any known machine may be employed for operating the said tools. The grooved and channeled face of the glass plate 1 is then rubbed with graphite-powder, which will adhere to the comparatively rough walls of the fine grooves 4, 5 and the collecting channels 2, 3, so that most of the graphite can be again removed by sweeping the grooves and channels in their longitudinal direction with a fine hair-brush, when a lining 8 of graphite will be left on their walls, as is shown at Fig. 6. At last the face of the glass plate 1 is freed from the graphite by wiping off. The so prepared glass plate 1 is next inserted in a metal-bath and provided with metallic conductors by any galvanoplastic process, the graphite lining 8 serving as a conductor on which the metal 9 (Fig. 6) is deposited. In this manner fine metallic conductors 10 and 11 are formed in the grooves 4 and 5 respectively, while collecting conductors 12 and 13 are formed in the channels 2 and 3 respectively. These conductors 10, 11, 12, 13 are preferably in a known manner fastened in the glass plate 1 by burning in, the glass plate 1 being placed in some muffle or other furnace. The lining 8 of graphite may wholly or partly disappear during the burning, as it is turned into carbonic oxid which escapes. After the metallic conductors have been burned in, the face of the glass plate 1 is preferably again ground or polished, so as to produce a smooth face, in which the parallel metallic conductors 10 and 11 appear as hair-lines. The widened parts 14 and 15 of the collecting conductors 12 and 13 can then serve as contact surfaces on which contact screws of binding posts (not shown) of any known construction can be pressed for establishing the electrical contact between the conductors 12, 13 and the binding posts. At last the face of the plate 1 is covered with a very thin layer 16 of selenium or the like, the corners 17, 18 (Fig. 1) alone being left uncovered, so as to give access to the widened parts 14, 15 of the collecting conductors. Obviously the two uncovered corners 17 and 18 need not be opposite to one another, but may be on the same side. The selenium is applied to the face of the plate 1 in as fine a layer 16 as ever possible, so that the thickness of this layer may be perhaps but one hundredth part of a millimeter. It is essential, that this layer 16 be made as thin as possible, as the light will then be enabled to penetrate into it the more rapidly.

In Fig. 6 I have assumed the metallic conductors 10 and 11 to be semicylindrical, but they may have any other cross section, as is for example illustrated at Fig. 7, in which they are shown to be square in section. The shape of these conductors will have to depend upon the tool or the process by means of which the grooves 4 and 5 are produced. The cell so produced is extremely sensitive. Instead of glass also porcelain or any other similar insulating material may be employed for the supporting plate 1.

As mentioned above, the plate provided with metallic conductors is after the burning preferably smoothed on its face by grinding or polishing. This is done for the reason, that the covering layer of selenium or the like subsequently applied to it will then be better protected from getting damaged.

Where so preferred, the collecting conductors of the cell may be formed on two opposite edges of the plate of glass or the like, as is for example shown at Figs. 8 to 10. Here the plate 19 of glass, porcelain or the like is provided on its top face with a series of parallel conductors 20, 21 which alternately reach to a point near one or the opposite side and are made in one with the collecting conductors 22 or 23 on the edge of the plate 19 (Fig. 12). Of course the two opposite edges of the plate require to be previously roughened by grinding or otherwise, in order to enable the graphite-powder to adhere to them previous to the galvanoplastic process. The covering layer 24 of selenium or the like then covers only the parallel conductors 20, 21 and the upper edges of the collecting conductors 22, 23. The so prepared cell may be placed on a supporting board 25 of insulating material and provided with two parallel metallic strips 26 and 27, which latter are in any known manner (not shown) pressed against the collecting conductors 22 and 23, so as to insure the electrical contact between them. The metallic strips 26 and 27 may be provided with binding posts 28 and 29 as shown at Figs. 8 and 9. The sensitive cell may also be a cylinder, as is for example shown at Figs. 13 and 14 which illustrate two sensitive cylinders on a magnified scale, this scale being selected for similar reasons as mentioned above. The cylinder shown at Fig. 13 has near its ends two annular collecting conductors 30 and 31 widened at 32 and 33, which widened parts serve as contact surfaces, against which screws of known binding posts or the like can be pressed for establishing the electrical contact. The fine parallel conductors 34 and 35 are placed parallel to the axis of the cylinder and the cylindrical surface of the latter is covered with a thin layer 36 of selenium or the like. Obviously the conductors shown at Fig. 13 correspond to those in Fig. 3. The cylinder shown at Fig. 14 only differs from Fig. 13 in that the annular collecting conductors 30 and 31 are replaced by plain disk-like conductors 37 and 38 on the end sides of the cylinder, while the conductors 38ª are extended to the top edge and the conductors 39 to the bottom edge. Therefore the arrangement of the conductors of this cylinder corresponds to that of the plate in Fig. 10. Evidently the end sides of the cylinder require to be rough, say by grinding, in order to be able to form on them graphite linings previous to the galvanoplastic process. It is of course not necessary, that the collecting conductors 37 and 38 should cover the whole surfaces of the plain end sides. They may cover only annular strips along the edges of the cylinder, in which case they will be in the form of rings 40, one of which is shown on a reduced scale in Fig. 18.

Obviously the parallel conductors on a sensitive cylinder may be placed at right angles to its axis and the collecting conductors may be placed parallel to the said axis. Fig. 3 may be considered as an evolution of such a sensitive cylinder. Where so preferred, the sensitive cylinder may have its metallic conductors with the covering layer only on one half or a smaller part of its circumference. The sensitive cell may also be a semicylinder as shown at Fig. 15, where it may be assumed to have its metallic conductors on the front side and hidden by the covering layer. However, the metallic conductors with the covering layer may also be placed only on the plain side at the rear. The sensitive cell may be a cylinder-lens as shown at Fig. 16, and the cylinder-lens may have the metallic conductors with the covering layer on one side only. In a similar manner the sensitive cell may be a prism, the base of which is a segment, as is shown at Fig. 17. The sensitive cell may also be any other mathematical body, such as a lens or the like.

I claim:

1. The process of producing electrodes for sensitive cells, which consists in providing a body of insulating material with parallel hair-like grooves on its face and with two roughened strips which separately adjoin said hair-like grooves alternately, rubbing the body with graphite-powder, freeing the body from the graphite by wiping, and forming by a galvanoplastic process electrical conductors on the graphite in the hair-like grooves and on the roughened strips.

2. The process of producing electrodes for sensitive cells, which consists in providing a body of insulating material with parallel hair-like grooves on its face and with two roughened strips which separately adjoin said hair-like grooves alternately, rubbing the body with graphite-powder, freeing the body from the graphite by wiping, forming by a galvanoplastic process electrical conductors on the graphite in the hair-like grooves and on the roughened strips, and fastening the electrical conductors in the body by burning in.

3. The process of producing electrodes for sensitive cells, which consists in truing up a body of insulating material on its face, providing it with parallel hair-like grooves on its face and with two roughened strips which separately adjoin said hair-like grooves alternately, rubbing the body with graphite-powder, freeing the face of the body from the graphite by wiping, forming by a galvanoplastic process electrical conductors on the graphite in the hair-like grooves and on the roughened strips, fastening the electrical conductors in the body by burning in, and polishing the body.

4. The process of producing electrodes for sensitive cells, which consists in providing a body of insulating material with parallel hair-like grooves on its face and with two roughened strips which separately adjoin said hair-like grooves alternately, rubbing the body with graphite-powder, longitudinally sweeping the hair-like grooves and the two roughened strips with a hair-brush so as to leave behind a graphite-lining on their walls, freeing the body from the graphite by wiping, and forming by a galvanoplastic process electrical conductors on the graphite-lining on the walls of the grooves and the two strips.

5. The process of producing electrodes for sensitive cells, which consists in providing a body of insulating material with parallel hair-like grooves on its face and with two roughened strips which separately adjoin said hair-like grooves alternately, rubbing the body with graphite-powder, longitudinally sweeping the hair-like grooves and the two roughened strips with a hair-brush so as to leave behind a graphite-lining on their walls, freeing the face of the body from the graphite by wiping, forming by a galvanoplastic process electrical conductors on the graphite-lining on the walls of the grooves and the two strips, and fastening the electrical conductors in the body by burning in.

6. The process of producing electrodes for sensitive cells, which consists in truing up a body of insulating material on its face, providing it with parallel hair-like grooves on its face and with two roughened strips which separately adjoin said hair-like grooves alternately, rubbing the body with graphite-powder, longitudinally sweeping the hair-like grooves and the two roughened strips with a hair-brush so as to leave behind a graphite-lining on their walls, freeing the face of the body from the graphite by wiping, forming by a galvanoplastic process electrical conductors on the graphite-lining on the walls of the grooves and the two strips, fastening the electrical conductors in the body by burning in, and polishing the body.

7. The process of producing sensitive cells, which consists in providing a body of insulating material with parallel hair-like grooves on its face and with two roughened strips which separately adjoin said hair-like grooves alternately, rubbing the body with graphite-powder, freeing the body from the graphite by wiping, forming by a galvanoplastic process electrical conductors on the graphite in the hair-like grooves and on the roughened strips, and covering the face of the body with a thin layer of selenium.

8. The process of producing sensitive cells, which consists in providing a body of insulating material with parallel hair-like grooves on its face and with two roughened strips which separately adjoin said hair-like grooves alternately, rubbing the body with graphite-powder, freeing the body from the graphite by wiping, forming by a galvanoplastic process electrical conductors on the graphite in the hair-like grooves and on the roughened strips, fastening the electrical conductors in the body by burning in, and covering the face of the body with a thin layer of selenium.

9. The process of producing sensitive cells, which consists in truing up a body of insulating material on its face, providing it with parallel hair-like grooves on its face and with two roughened strips which separately adjoin said hair-like grooves alternately, rubbing the body with graphite-powder, freeing the face of the body from the graphite by wiping, forming by a galvanoplastic process electrical conductors on the graphite in the hair-like grooves and on the roughened strips, fastening the electrical conductors in the body by burning in, polishing the body, and covering the face of the body with a thin layer of selenium.

10. The process of producing sensitive cells, which consists in providing a body of insulating material with parallel hair-like grooves on its face and with two roughened strips which separately adjoin said hair-like grooves alternately, rubbing the body with graphite-powder, longitudinally sweeping the hair-like grooves and the two roughened strips with a hair-brush so as to leave behind a graphite-lining on their walls, freeing the body from the graphite by wiping, forming by a galvanoplastic process electrical conductors on the graphite-lining on the walls of the grooves and the two strips, and covering the face of the body with a thin layer of selenium.

11. The process of producing sensitive cells, which consists in providing a body of insulating material with parallel hair-like grooves on its face and with two roughened strips which separately adjoin said hair-like grooves alternately, rubbing the body with graphite-powder, longitudinally sweeping the hair-like grooves and the two roughened strips with a hair-brush so as to leave behind a graphite-lining on their walls, freeing the face of the body from the graphite by wiping, forming by a galvanoplastic process electrical conductors on the graphite-lining on the walls of the grooves and the two strips, fastening the electric conductors in the body by burning in, and covering the face of the body with a thin layer of selenium.

12. The process of producing sensitive cells, which consists in truing up a body of insulating material on its face, providing it with parallel hair-like grooves on its face and with two roughened strips which separately adjoin said hair-like grooves alternately, rubbing the body with graphite-powder, longitudinally sweeping the hair-like grooves and the two roughened strips with a hair-brush so as to leave behind a graphite-layer on their walls, freeing the face of the body from the graphite by wiping, forming by a galvanoplastic process electrical conductors on the graphite-lining on the walls of the grooves and the two strips, fastening the electrical conductors in the body by burning in, polishing the body, and covering the face of the body with a thin layer of selenium.

13. The process of producing electrodes for sensitive cells, which consists in providing a plate of insulating material with parallel hair-like grooves on its face and with two roughened strips which separately adjoin said hair-like grooves alternately, rubbing the plate with graphite-powder, freeing the plate from the graphite by wiping, and forming by a galvanoplastic process electrical conductors on the graphite in the hair-like grooves and on the roughened strips.

14. The process of producing electrodes for sensitive cells, which consists in providing a plate of insulating material with parallel hair-like grooves on its face and with two roughened strips which separately adjoin said hair-like grooves alternately, rubbing the plate with graphite-powder, freeing the plate from the graphite by wiping, forming by a galvanoplastic process electrical conductors on the graphite in the hair-like grooves and on the roughened strips, and fastening the electrical conductors in the plate by burning in.

15. The process of producing electrodes for sensitive cells, which consists in truing up a plate of insulating material on its face, providing it with parallel hair-like grooves on its face and with two roughened strips which separately adjoin said hair-like grooves alternately, rubbing the plate with graphite-powder, freeing the face of the plate from the graphite by wiping, forming by a galvanoplastic process electrical conductors on the graphite in the hair-like grooves and on the roughened strips, fastening the electrical conductors in the plate by burning in, and polishing the plate.

16. The process of producing electrodes for sensitive cells, which consists in providing a plate of insulating material with parallel hair-like grooves on its face and with two roughened strips which separately adjoin said hair-like grooves alternately, rubbing the plate with graphite-powder, longitudinally sweeping the hair-like grooves and the two roughened strips with a hair-brush so as to leave behind a graphite-lining on their walls, freeing the plate from the graphite by wiping, and forming by a galvanoplastic process electrical conductors on the graphite-lining on the walls of the grooves and the two strips.

17. The process of producing electrodes for sensitive cells, which consists in providing a plate of insulating material with parallel hair-like grooves on its face and with two roughened strips which separately adjoin said hair-like grooves alternately, rubbing the plate with graphite-powder, longitudinally sweeping the hair-like grooves and the two roughened strips with a hair-brush so as to leave behind a graphite-lining on their walls, freeing the face of the plate from the graphite by wiping, forming by a galvanoplastic process electrical conductors on the graphite-lining on the walls of the grooves and the two strips, and fastening the electrical conductors in the plate by burning in.

18. The process of producing electrodes for sensitive cells, which consists in truing up a plate of insulating material on its face, providing it with parallel hair-like grooves on its face and with two roughened strips which separately adjoin said hair-like grooves alternately, rubbing the plate with graphite-powder, longitudinally sweeping the hair-like grooves and the two roughened strips with a hair-brush so as to leave behind a graphite-lining on their walls, freeing the face of the plate from the graphite by wiping, forming by a galvanoplastic process electrical conductors on the graphite-lining on the walls of the grooves and the two strips, fastening the electrical conductors in the plate by burning in, and polishing the plate.

19. The process of producing sensitive cells, which consists in providing a plate of insulating material with parallel hair-like grooves on its face and with two roughened strips which separately adjoin said hair-like grooves alternately, rubbing the plate with graphite-powder, freeing the plate from the graphite by wiping, forming by a galvanoplastic process electrical conductors on the graphite in the hair-like grooves and on the roughened strips, and covering the face of the plate with a thin layer of selenium.

20. The process of producing sensitive cells, which consists in providing a plate of insulating material with parallel hair-like grooves on its face and with two roughened strips which separately adjoin said hair-like grooves alternately, rubbing the plate with graphite-powder, freeing the plate from the graphite by wiping, forming by a galvanoplastic process electrical conductors on the graphite in the hair-like grooves and on the roughened strips, fastening the electrical conductors in the plate by burning in, and covering the face of the plate with a thin layer of selenium.

21. The process of producing sensitive cells, which consists in truing up a plate of insulating material on its face, providing it with parallel hair-like grooves on its face and with two roughened strips which separately adjoin said hair-like grooves alternately, rubbing the plate with graphite-powder, freeing the face of the plate from the graphite by wiping, forming by a galvanoplastic process electrical conductors on the graphite in the hair-like grooves and on the roughened strips, fastening the electrical conductors in the plate by burning in, polishing the plate, and covering the face of the plate with a thin layer of selenium.

22. The process of producing sensitive cells, which consists in providing a plate of insulating material with parallel hair-like grooves on its face and with two roughened strips which separately adjoin said hair-like grooves alternately, rubbing the plate with graphite-powder, longitudinally sweeping the hair-like grooves and the two roughened strips with a hair-brush so as to leave behind a graphite-lining on their walls, freeing the plate from the graphite by wiping, forming by a galvanoplastic process electrical conductors on the graphite-lining on the walls of the grooves and the two strips, and covering the face of the plate with a thin layer of selenium.

23. The process of producing sensitive cells, which consists in providing a plate of insulating material with parallel hair-like grooves on its face and with two roughened strips which separately adjoin said hair-like grooves alternately, rubbing the plate with graphite-powder, longitudinally sweeping the hair-like grooves and the two roughened strips with a hair-brush so as to leave behind a graphite-lining on their walls, freeing the face of the plate from the graphite by wiping, forming by a galvanoplastic process electrical conductors on the graphite-lining on the walls of the grooves and the two strips, fastening the electrical conductors in the plate by burning in, and covering the face of the plate with a thin layer of selenium.

24. The process of producing sensitive cells, which consists in truing up a plate of insulating material on its face, providing it with parallel hair-like grooves on its face and with two roughened strips which separately adjoin said hair-like grooves alternately, rubbing the plate with graphite-powder, longitudinally sweeping the hair-like grooves and the two roughened strips with a hair-brush so as to leave behind a graphite-lining on their walls, freeing the face of the plate from the graphite by wiping, forming by a galvanoplastic process electrical conductors on the graphite-lining on the walls of the grooves and the two strips, fastening the electrical conductors in the plate by burning in, polishing the plate, and covering the face of the plate with a thin layer of selenium.

PAUL RIBBE.

Witnesses:
   HENRY HASPER,
   WOLDEMAR HAUPT.